(12) United States Patent
Ishii et al.

(10) Patent No.: US 10,436,105 B2
(45) Date of Patent: Oct. 8, 2019

(54) EXHAUST STRUCTURE

(71) Applicant: HONDA MOTOR CO., LTD., Tokyo (JP)

(72) Inventors: Kazumasa Ishii, Saitama (JP); Noritaka Yamamoto, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 94 days.

(21) Appl. No.: 15/034,024

(22) PCT Filed: Oct. 2, 2014

(86) PCT No.: PCT/JP2014/076354
§ 371 (c)(1),
(2) Date: May 3, 2016

(87) PCT Pub. No.: WO2015/068504
PCT Pub. Date: May 14, 2015

(65) Prior Publication Data
US 2016/0281592 A1  Sep. 29, 2016

(30) Foreign Application Priority Data

Nov. 7, 2013  (JP) .................................. 2013-231185

(51) Int. Cl.
*F02B 37/18*  (2006.01)
*F01N 13/00*  (2010.01)
(Continued)

(52) U.S. Cl.
CPC .......... *F02B 37/186* (2013.01); *F01N 13/008* (2013.01); *F01N 13/143* (2013.01);
(Continued)

(58) Field of Classification Search
CPC ...... F02B 37/18; F02B 37/183; F02B 37/186; F01N 13/008; F01N 13/143; F01N 2260/20; Y02T 10/144
See application file for complete search history.

(56) References Cited

U.S. PATENT DOCUMENTS

| 4,875,837 A | * | 10/1989 | Usami | ................... | F01D 25/145 |
| | | | | | 417/407 |
| 7,269,950 B2 | * | 9/2007 | Pedersen | ................. | F01D 17/14 |
| | | | | | 417/406 |

(Continued)

FOREIGN PATENT DOCUMENTS

| CN | 101619669 A | 1/2010 |
| CN | 202914175 U | 5/2013 |

(Continued)

OTHER PUBLICATIONS

JPH 0681955 English Translation.*

(Continued)

*Primary Examiner* — Jason D Shanske
*Assistant Examiner* — Jessica L Kebea
(74) *Attorney, Agent, or Firm* — Squire Patton Boggs (US) LLP

(57) ABSTRACT

An exhaust structure is provided with an exhaust manifold, and a supercharger having a turbine housing. The turbine housing is provided with an inflow port interconnected with the exhaust manifold, a housing member in which a space for housing turbine blades is formed, and an inflow port in which an inflow passage communicating from the inflow port through the housing space is formed. A sensor mounting part is formed in the inflow port, and a throttle member is formed such that the width thereof in an aligning direction of cylinders gradually decreases from the inflow port toward the sensor mounting part. With this configuration, the accu- (Continued)

racy of detecting the combustion state of the cylinders can be increased.

5 Claims, 5 Drawing Sheets

(51) Int. Cl.
  *F01N 13/14* (2010.01)
  *F02F 1/24* (2006.01)
  *F02B 67/10* (2006.01)
  *F02F 1/42* (2006.01)

(52) U.S. Cl.
  CPC ............... *F02F 1/243* (2013.01); *F02F 1/42* (2013.01); *F01N 2260/20* (2013.01); *F02B 67/10* (2013.01); *Y02T 10/144* (2013.01)

(56) References Cited

U.S. PATENT DOCUMENTS

| | | | | |
|---|---|---|---|---|
| 2002/0078934 A1* | 6/2002 | Hohkita | ............... | F01N 3/006 |
| | | | | 123/564 |
| 2003/0172653 A1* | 9/2003 | Mayer | ................... | F02B 37/24 |
| | | | | 60/602 |
| 2004/0011037 A1* | 1/2004 | Zimmer | ................. | F01D 25/24 |
| | | | | 60/612 |
| 2007/0217941 A1* | 9/2007 | Hayashi | ............... | C22C 38/001 |
| | | | | 420/38 |
| 2009/0126355 A1 | 5/2009 | Uchida | | |
| 2010/0000201 A1 | 1/2010 | Hoshi | | |
| 2012/0085092 A1 | 4/2012 | Hotta et al. | | |
| 2012/0137677 A1* | 6/2012 | Sato | ........................ | F02B 37/18 |
| | | | | 60/603 |
| 2012/0192557 A1* | 8/2012 | Johnson | ............... | F01D 17/105 |
| | | | | 60/599 |
| 2012/0291431 A1* | 11/2012 | Bucknell | .............. | F01N 3/0835 |
| | | | | 60/602 |
| 2012/0312011 A1* | 12/2012 | Romblom | .............. | F01D 9/026 |
| | | | | 60/605.1 |
| 2013/0291811 A1* | 11/2013 | Kuhlbach | ............... | F02F 1/243 |
| | | | | 123/41.72 |
| 2014/0026562 A1* | 1/2014 | Brueck | ..................... | F02C 7/00 |
| | | | | 60/605.1 |
| 2015/0034029 A1* | 2/2015 | Obenaus | ................. | F02B 37/02 |
| | | | | 123/41.82 R |
| 2018/0334944 A1* | 11/2018 | Hideshima | ............ | F01N 13/008 |

FOREIGN PATENT DOCUMENTS

| | | | | |
|---|---|---|---|---|
| EP | 2690266 A1 * | 1/2014 | ............... | F02C 7/00 |
| JP | 62-162349 U | 10/1987 | | |
| JP | 5-078919 U | 10/1993 | | |
| JP | 06-081955 A | 3/1994 | | |
| JP | 2003254051 A * | 9/2003 | .......... | F01N 3/2006 |
| JP | 2004-076632 A | 3/2004 | | |
| JP | 2005-256785 A | 9/2005 | | |
| JP | 2007-198256 A | 8/2007 | | |
| JP | 2007247409 A * | 9/2007 | | |
| JP | 2009-047138 A | 3/2009 | | |
| JP | 4544116 B2 | 9/2010 | | |
| JP | 2011-247231 A | 12/2011 | | |
| KR | 20060037719 A | 5/2006 | | |
| WO | 2011/114448 A1 | 9/2011 | | |

OTHER PUBLICATIONS

JP2005256785 English Translation.*
English Translation of JP 2007247409 A.*
JP 2003-254051 English Translation.*
International Search Report & Written Opinion dated Jan. 6, 2015 corresponding to International Patent Application No. PCT/JP2014/076354, and English translation thereof.
The First Office Action dated Sep. 5, 2017 corresponding to Chinese Patent Application No. 201480061266.5, and English translation thereof.
Office Action dated May 22, 2019 issued in corresponding Indian Patent Application No. 201647019413, and English translation thereof.

* cited by examiner

EXHAUST STRUCTURE

TECHNICAL FIELD

The present invention relates to an exhaust structure of an internal combustion engine.

BACKGROUND ART

There is an exhaust structure of an internal combustion engine mounted on a vehicle, which includes an exhaust manifold, and a supercharger having a turbine housing connected to the exhaust manifold (see, for example, Patent Document 1). Further, in the exhaust structure as described above, sensors for performing an imbalance detection to detect combustion state of the cylinders are installed in exhaust gas flow passages.

PRIOR ART

Patent Document 1: JP4544116 B

SUMMARY OF INVENTION

Problem to be Solved by Invention

In the imbalance detection described above, sensors for detecting an air-fuel ratio, a temperature, etc are installed in the exhaust flow passage to detect an exhaust gas state of each of the cylinders. Accordingly, when an exhaust gas exhausted by one cylinder is mixed with another exhaust gas exhausted from another cylinder on an upstream side, an accuracy in detecting a combustion state of each cylinder decreases.

The present invention has been made to solve the above problem to provide an exhaust structure capable of increase a detection accuracy of the combustion state of each of the cylinders.

Means for Solving Problem

In order to solve the above-described problem, the present invention provides an exhausting structure including:
 an exhaust manifold including a collector to collect exhaust gases exhausted from a plurality of cylinders of an internal combustion engine; and
 a supercharger including a turbine housing connected to the exhaust manifold.
 The turbine housing includes:
 an inflow port communicating with the collector;
 a housing including a housing space formed to house turbine blades; and
 an inflow member including an inflow passage formed to communicate from the inflow port to the housing space.
 In the inflow member,
 a sensor mount to mount a sensor to detect a state of the exhaust gas in the inflow passage; and
 a tapered portion of a conduit having a width in an aligning direction AD of the cylinders gradually decreases as going from the inflow port to the sensor mount, are formed.
 In the above-described structure, it is possible to increase a flow velocity of the exhaust gas by allowing the exhaust gas exhausted by a cylinder to flow into the tapered portion. This accelerates exchange of the exhaust gas around a detection region of the sensor, so that it is possible to detect the state of the exhaust gas from each of the cylinders more rapidly.

Further, the exhaust gas exhausted from the cylinders is throttled by the tapered portion, which prevents the exhaust gas from spreading.

According to the present invention, it is possible to more accurately detect the state of the exhaust gas from each of the cylinders with the sensor, which increases a detection accuracy of the burning state at each of the cylinders.

In the exhaust structure as described above, it is desirable that a center, in the aligning direction AD of the cylinders, of the sensor mount is disposed on one side of a center of the inflow port in the aligning direction AD of the cylinders.

As described above, the sensor mounting part is offset to one side of the center of the inflow port, which secures a space on the other side of the inflow port. This makes it easy to make layout for various components around the supercharger.

In the exhaust structure, the turbine housing may be provided with an outflow passage communicating from the housing space to the outflow port and a waste gate passage communicating from the inflow passage to the outflow passage, and a waste gate valve may be mounted to adjust a flow rate of the exhaust gas in the waste gate passage. In this case, it is desirable that the sensor is disposed to have an offset D1 to one side of the center of the inflow port in the cylinder aligning direction AD and the waste gate valve is disposed on the other side in the aligning direction AD of the inflow port.

In this structure, the waste gate valve can be disposed using a space secured on the other side of the inflow port, so that an installation space for the supercharger can be reduced.

In the exhaust structure, in the turbine housing, preferably,
 an outflow passage communicating from the housing space to the outflow port and a waste gate passage communicating from the inflow port to the outflow passage are formed; and,
 further a connecting member between the inflow passage and the waste gate passage is formed on a downstream side from the sensor mounting part in a flowing direction of the exhaust gas.

In this structure, the exhaust gas flows into the waste gate passage on the downstream side of the sensor, which prevents the sensor from influencing on the detection accuracy of the exhaust gas.

In the exhaust structure described above, when the thermal insulation cover covering at least a part of the turbine housing is provided, it is desirable to avoid a temperature increase of the sensor by introducing an ambient air into the thermal insulation caver through a ventilation air-guide-port opening in the thermal insulation cover.

Further, when the internal combustion engine is mounted on a vehicle, it is desirable that the internal combustion engine is mounted on a vehicle, wherein the ventilation air-guide-port opens in a downward direction of the vehicle. This structure does not decrease the thermal insulation effect toward the front of the vehicle by the thermal insulation cover, which prevents the temperature increase of the sensor in the thermal insulation cover.

In the exhaust structure described above, it can be allowed that the exhaust manifold is installed in a cylinder head of the internal combustion engine, wherein the exhaust emission control device is installed on the other side, in the aligning direction AD of the cylinders, of the turbine housing. In this case, a connecting passage provided between the turbine housing and the exhaust emission control device is bent toward the axial direction of the cylinders from the aligning direction AD of the cylinders to extend the exhaust emission control device along the axial direction of the cylinders.

In this configuration, the sensor mounting part is offset D1 toward one side of the center of the inflow port, which can offset the connecting passage connected to the other side of the turbine housing toward the one side. This allows the connecting passage between the turbine housing and the exhaust emission control device can be bent at a substantially right angle from the aligning direction AD of the cylinders to the axial direction of the cylinders, and the exhaust emission control device can be extended along the axial direction of the cylinders. Accordingly, a pressure loss of the exhaust gas in the connecting passage can be made small while the exhaust emission control device can be housed within a width of the internal combustion engine in the aligning direction AD of the cylinders.

Further, when the mounting part for mounting the turbine housing on the internal combustion engine is provided on the other side of the turbine housing, it is made easier to mount the turbine housing on the internal combustion engine because it becomes easier to arrange a tool, assembling a fixing member such as bolts for the mounting part, etc with the mounting part, from a surrounding place of the internal combustion engine.

Further, the exhaust emission control device is disposed near the internal combustion engine and a high temperature exhaust gas flows into the exhaust emission control device directly, so that a temperature of a catalyst in the exhaust emission control device can be rapidly increased.

Advantageous Effect of Invention

According to the exhaust structure of the present invention it is suppressed that the exhaust gas exhausted from one cylinder is mixed with an exhausted gas exhausted from the other cylinder on an upstream side of the sensor, so that a state of the exhausted gas from each of the cylinders can be detected at a high accuracy, which increases a detection accuracy of the combustion state of each of the cylinders.

MODES FOR CARRYING OUT INVENTION

An embodiment of the present invention is described in detail below with reference to drawings.

An exhaust structure according to the embodiment of the present invention is described below in a case where the exhaust structure according to the present invention is applied to an internal combustion engine (engine).

In the below description, a front-rear direction agrees with front and rear in a travelling direction of a vehicle, and left-right direction is a left-right direction when an internal combustion engine is viewed from a front direction of the vehicle. "Upstream" and "downstream" in the below description are "upstream" and "downstream" in flowing direction of the air and the exhaust gas.

Figure 1:
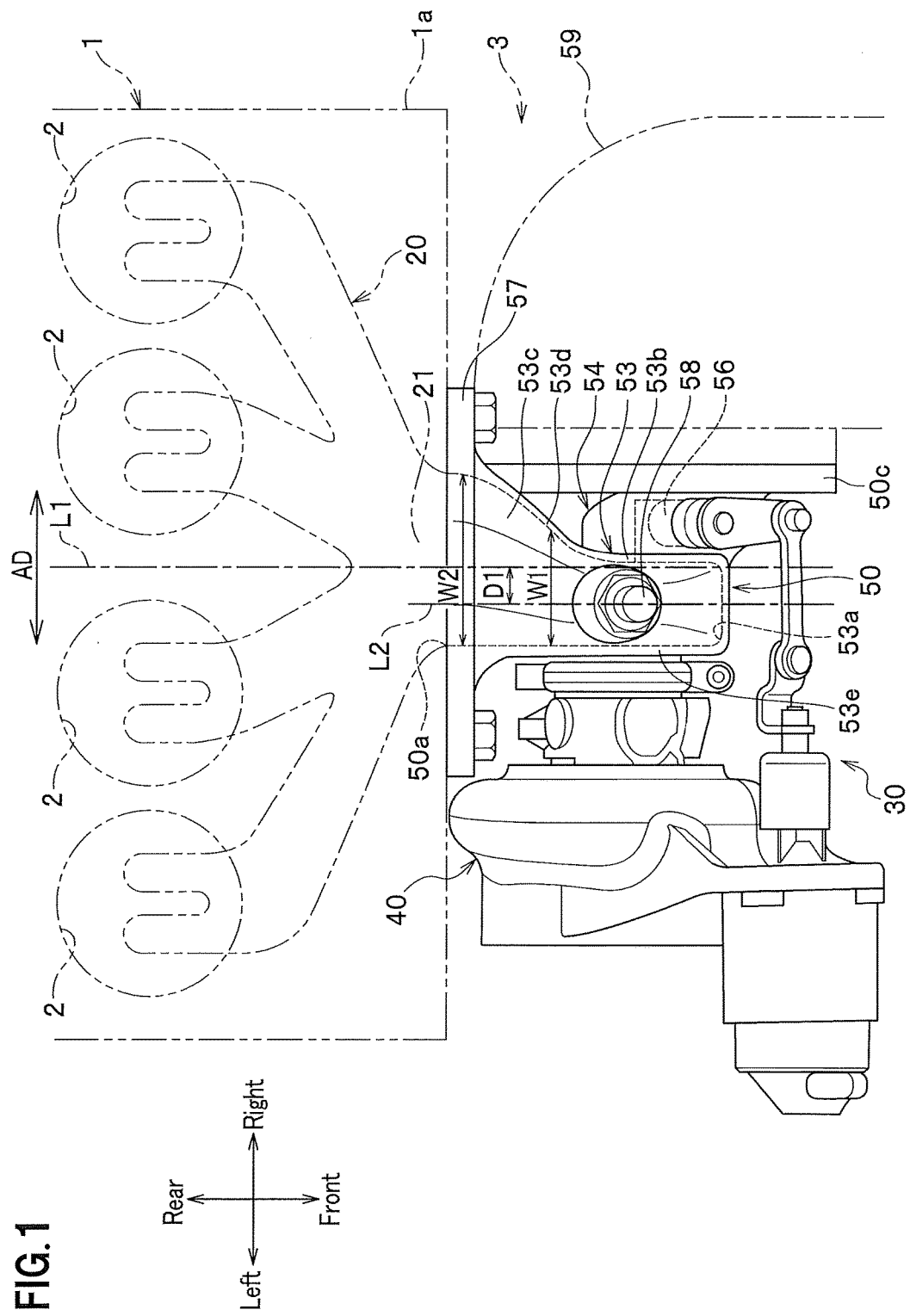
FIG. 1 is a drawing of an exhaust structure according to an embodiment of the present invention, viewed from a forwardly obliquely upward direction.

As illustrated in FIG. 1, an internal combustion engine 1 has four cylinders 2 arranged in the left-right direction (aligning direction AD). Each of the four cylinders 2 has an axis extending in the vertical direction.

Figure 2:
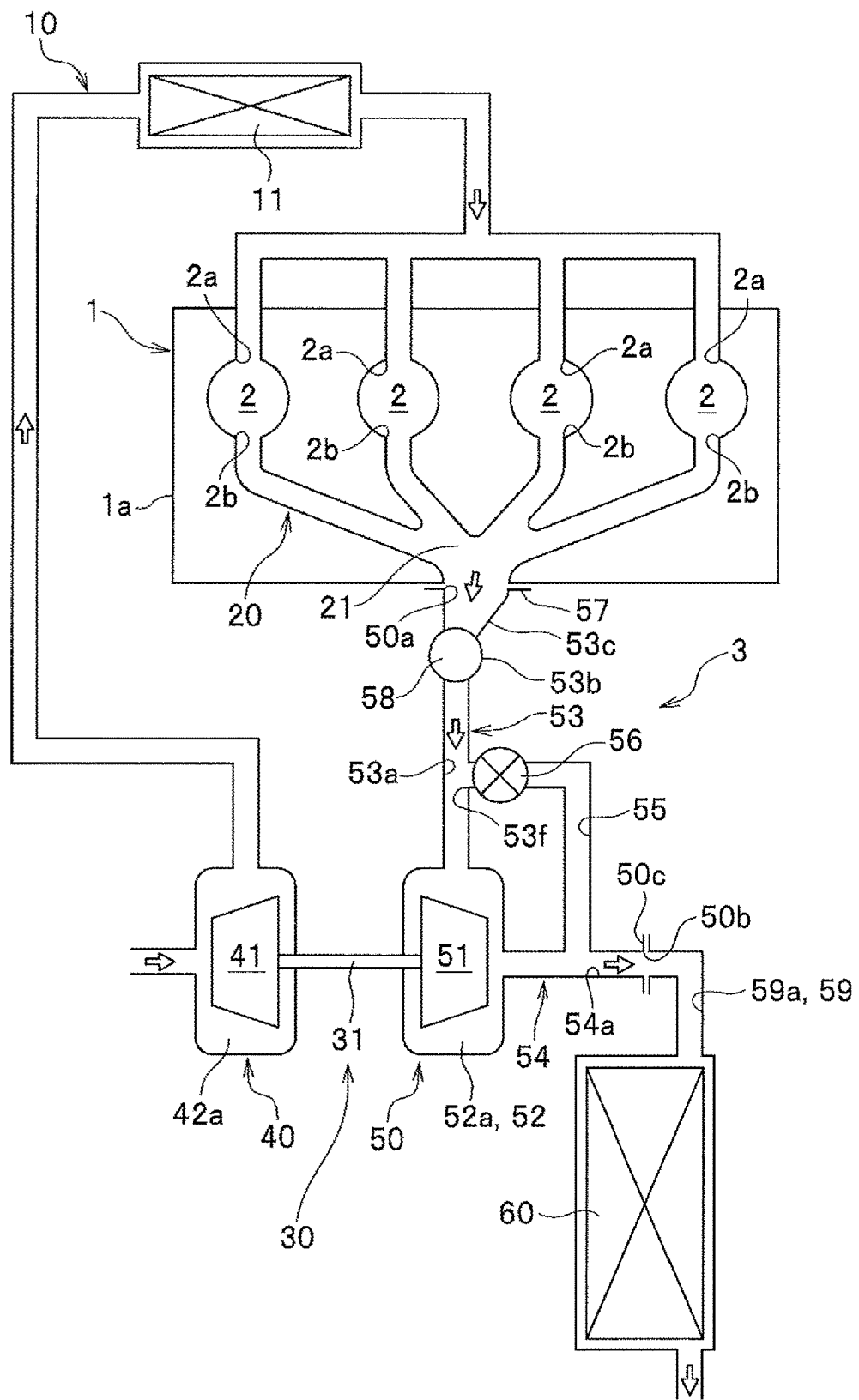
FIG. 2 is a schematic drawing of the exhaust structure according to the embodiment of the present invention.

As shown in FIG. 2, an intake port 2a of each of the four cylinders 2 is connected to an intake air passage 10. An intercooler 11 is provided at an intermediate portion of the intake air passage 10.

An exhaust structure 3 includes an exhaust manifold 20 connected to exhaust ports 2b of the four cylinders 2, a supercharger 30 connected to the intake air passage 10 and the exhaust manifold 20, and an exhaust emission control device 60 connected to the supercharger 30.

The exhaust manifolds 20 includes a collector 21 for collecting exhaust gas exhausted by respective the four cylinders 2. The exhaust manifolds 20 are installed in a cylinder head 1a.

The supercharger 30 includes a compressor housing 40 and a turbine housing 50 in which the compressor housing 40 and the turbine housing 50 are arranged side by side in the left-right direction (See FIG. 1).

In the compressor housing 40, a housing space 42a is formed. In the housing space 42a, compressor blades 41 are housed. Further, the housing space 42a is connected to upstream and downstream sides of the intake air passage 10.

The turbine housing 50 includes an inflow port 50a communicated with the collector 21 of the exhaust manifolds 20, a housing 52 in which a housing space 52a is formed, an inflow member 53 communicating from the inflow port 50a to the housing space 52a, the outflow member 54 communicating from the housing space 52a to an outflow port 50b, and a waste gate passage 55 communicating from an inflow passage 53a to the outflow passage 54a.

In the housing space 52a of the housing 52, turbine blades 51 are housed. The turbine blades 51 are connected to the compressor blades 41 with a connecting shaft 31, so that the compressor blades 41 rotate interlockingly with rotation of the turbine blades 51.

In the waste gate passage 55, a waste gate valve 56 is installed. The waste gate valve 56 is a valve opened and closed by a control device (not shown).

In the supercharger 30, the exhaust gas exhausted from each of the four cylinders 2 flows into the housing space 52a through the inflow passage 53a of the turbine housing 50 and rotates the turbine blades 51 by the exhaust gas. The compressor blades 41 rotate interlockingly with the rotation of the turbine blades 51, so that air is sucked into the housing space 42a of the compressor housing 40 from an upstream side of the intake air passage 10. Further, the pressurized air is exhausted to a downstream side of the intake air passage 10 from the housing space 42a of the compressor housing 40 to supply a pressurized air is supplied to each of the four cylinders 2.

It is noted that there may be a case where a supercharged pressure of the air supplied to each of the four cylinders 2 from the compressor housing 40 increases more than the demand due to increase in the rotation speed of the turbine blades 51 when the internal combustion engine 1 runs at a high rotation speed. In this case, the waste gate valve 56 is opened to allow a part of the exhaust gas in the inflow passage 53a to flow into the outflow passage 54a through the waste gate passage 55. This decreases a quantity of the exhaust gas flowing into the housing space 52a from the inflow passage 53a to decrease the rotation speeds of the turbine blades 51 and the compressor blades 41, so that the supercharged pressure of air supplied to each of the four cylinders 2 from the compressor housing 40 decreases.

In the turbine housing 50, as shown in FIG. 1, a fixing flange 57 is formed to be installed on a front face of the cylinder head 1a. At a bonding surface of the fixing flange 57, the inflow port 50a opens.

Figure 3:
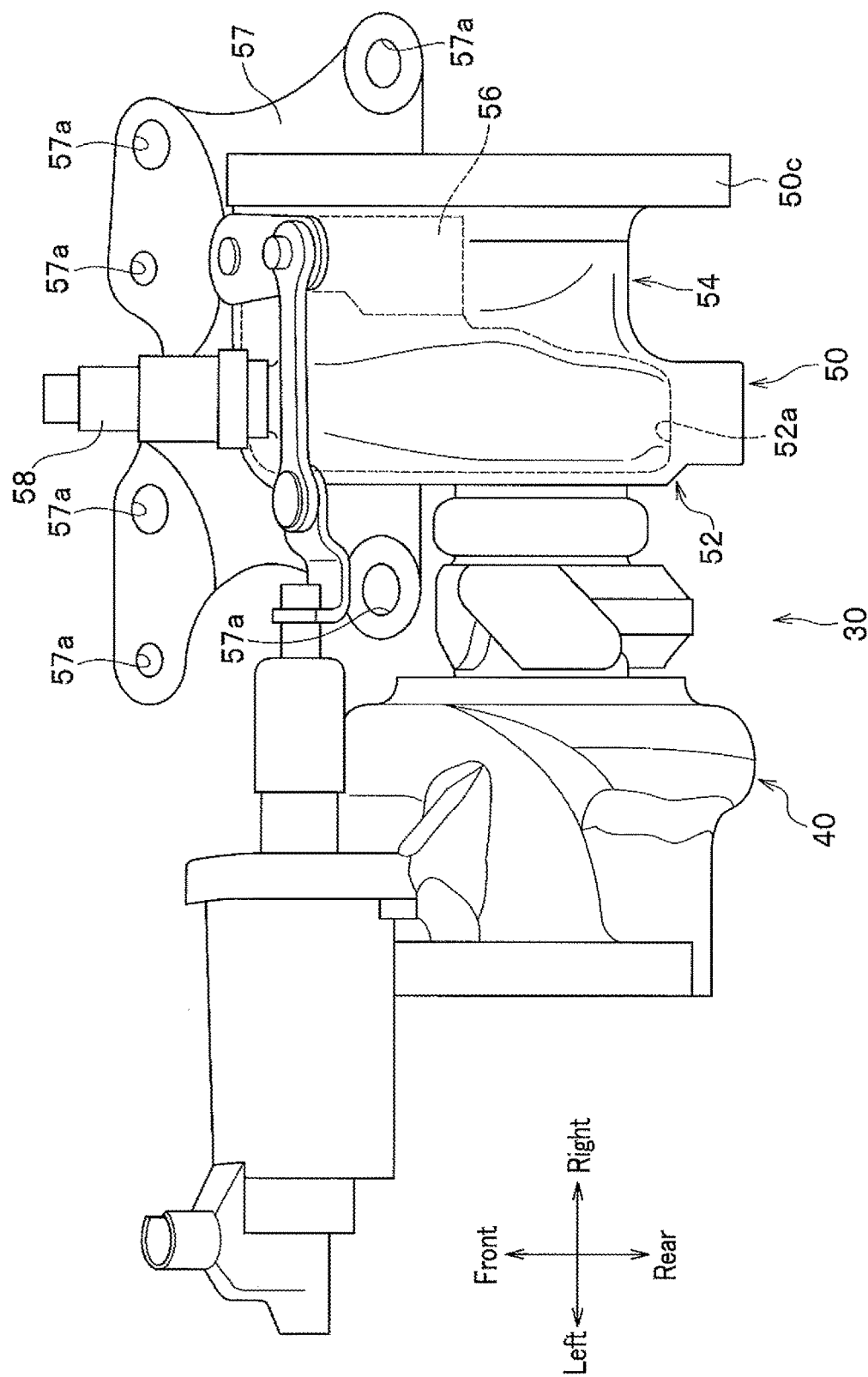
FIG. 3 is a drawing of the exhaust structure according to the embodiment of the present invention, viewed from a forwardly obliquely downward direction.

As shown in FIG. 3, at upper edges and lower left corner and lower right corner of the fixing flange 57, a plurality of fixing holes 57a penetrate the fixing flange 57. The turbine housing 50 is fixed to the cylinder head 1a by screwing bolts penetrated through the fixing holes 57a with thread screw holes of the cylinder head 1a (see FIG. 1).

Figure 5:
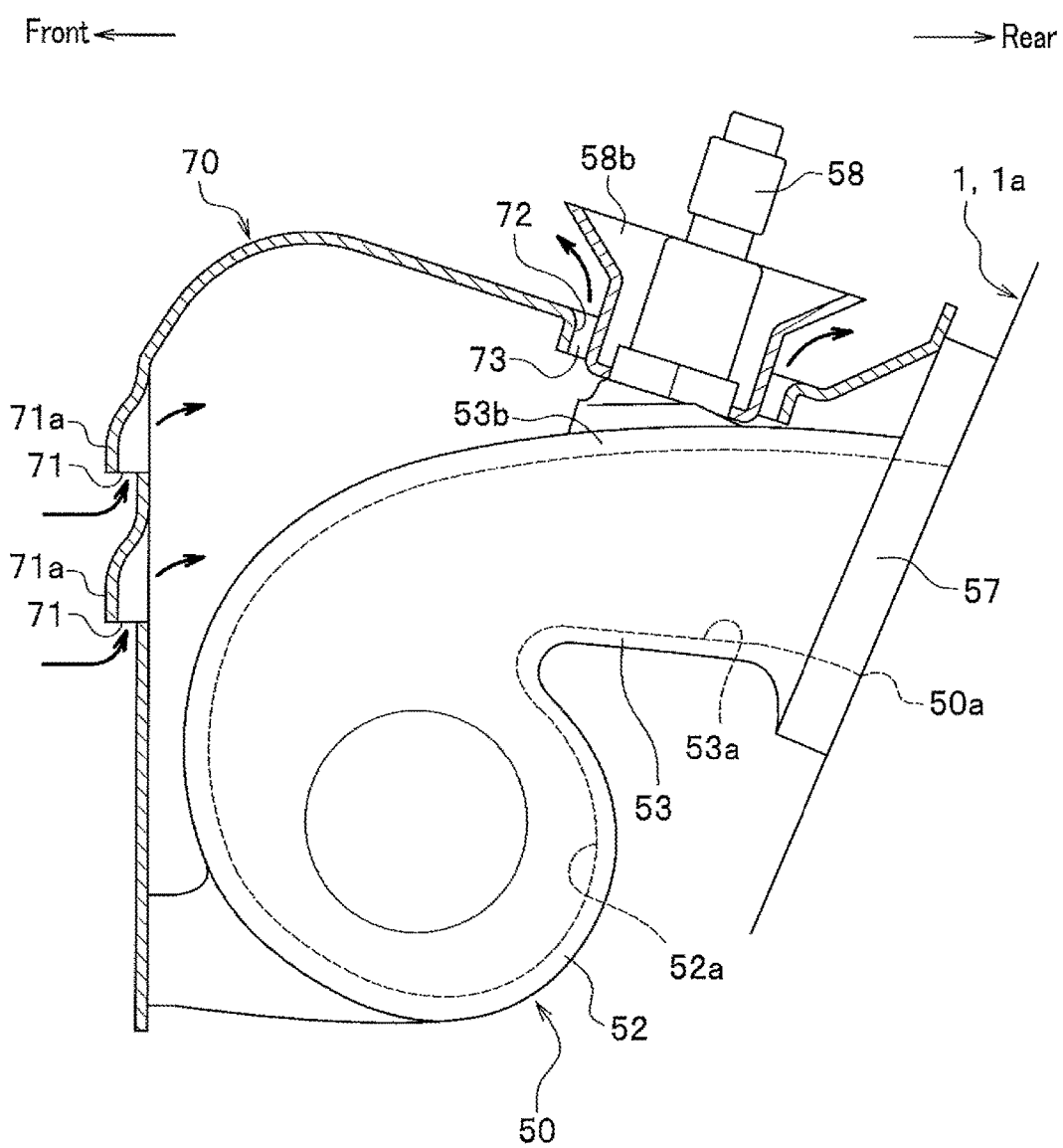
FIG. 5 is a side view of an air-guide-port in a thermal insulation cover according to the embodiment of the present invention.

As shown in FIG. 5, the inflow member 53 protrudes forward from the inflow port 50a and curved downward like spiral.

In the inflow member 53, at a substantially intermediate part between the inflow port 50a and the housing space 52a, a sensor mounting part 53b, to which a sensor 58 is fixed, is formed. In an outside wall of the sensor mounting part 53b, a fixing hole through which the sensor 58 is inserted, is formed.

A width of the sensor mounting part 53b in the left-right direction is, as shown in FIG. 1, decreased than a width W2 of the inflow port 50a in the left-right direction. At a center in the left-right direction of the sensor mounting part 53b, a fixing hole is formed.

A center of the sensor mounting part 53b in the left-right direction is disposed on a left side of the center of the inflow port 50a in the left-right direction. In FIG. 1, the center of the sensor mounting part 53b in the left-right direction is disposed on a line L2 which extends in an extending direction of the inflow passage 53a and is offset D1 on a left side of a line L1 passing a center of the inflow port 50a in the left-right direction.

A left edge of the inflow passage 53a in the sensor mounting part 53b and a left end part of the inflow port 50a are disposed at the same places in the left-right direction.

In the inflow member 53, between the inflow port 50a and a tapered portion sensor mounting part 53b the tapered portion 53c is formed.

The tapered portion 53c has a width W1 in the left-right direction gradually decreases as going from the inflow port 50a to the sensor mounting part 53b. In other words, the tapered portion 53c has a width W1 in the left-right direction gradually decreasing as going to a downstream side of the inflow passage 53a.

In this embodiment a right side part 53d of the inflow member 53 is successively offset (W2−W1) to the left side as going to the sensor mounting part 53b from the inflow port 50a of the inflow member 53 to form the tapered portion 53c. In addition, a left side part 53e of the inflow member 53 is formed in flat and has no offset (W2/2).

The inflow member 53 has the width W1 in the left-right direction decreasing and offset to a left side as going from the inflow port 50a to the sensor mounting part 53b. This forms a space on a right region of the sensor mounting part 53b.

An inner face on the right side of the inflow passage 53a in the tapered portion 53c is successively offset (W2−W1) on the left side of the inflow passage 53a of the tapered portion 53c, corresponding to an outer shape of the tapered portion 53c as going from the inflow port 50a to the sensor mounting part 53b. Accordingly, the inflow passage 53a has the width W1 of the inflow passage 53a in the left-right direction gradually decreasing as going from the inflow port 50a to the sensor mounting part 53b.

The sensor 58 is, for example, an A/F sensor to detect a fuel-air mixture ratio of the exhaust gas in the inflow passage 53a. The sensor 58 is inserted through a mounting hole of the sensor mounting part 53b and a detecting part protrudes in the inflow passage 53a and a base part protrudes outside of the inflow member 53. A detection result of the sensor 58 is applied to a control device (not shown).

As shown in FIG. 2, in the inflow member 53, a connecting member 53f for connecting the inflow passage 53a and the waste gate passage 55 is formed on a downstream side of the sensor mounting part 53b. At the connecting member 53f, the waste gate valve 56 is installed. The waste gate valve 56 is disposed at a space on the right side of the inflow member 53 as shown in FIG. 1.

At a right side part of the inflow member 53, a connecting flange 50c having a connecting surface having a normal line extending in the left-right direction is formed. On the connecting surface of the connecting flange 50c, the outflow port 50b (see FIG. 2) opens.

In the embodiment, the inflow member 53 is offset to the left side as going from the inflow port 50a to the sensor mounting part 53b. Accordingly, in this embodiment, the connecting flange 50c is more offset to the left side than a position of the connecting flange in the case where the sensor mounting part 53b is positioned at a center in the left-right direction of the inflow port 50a.

Figure 4:
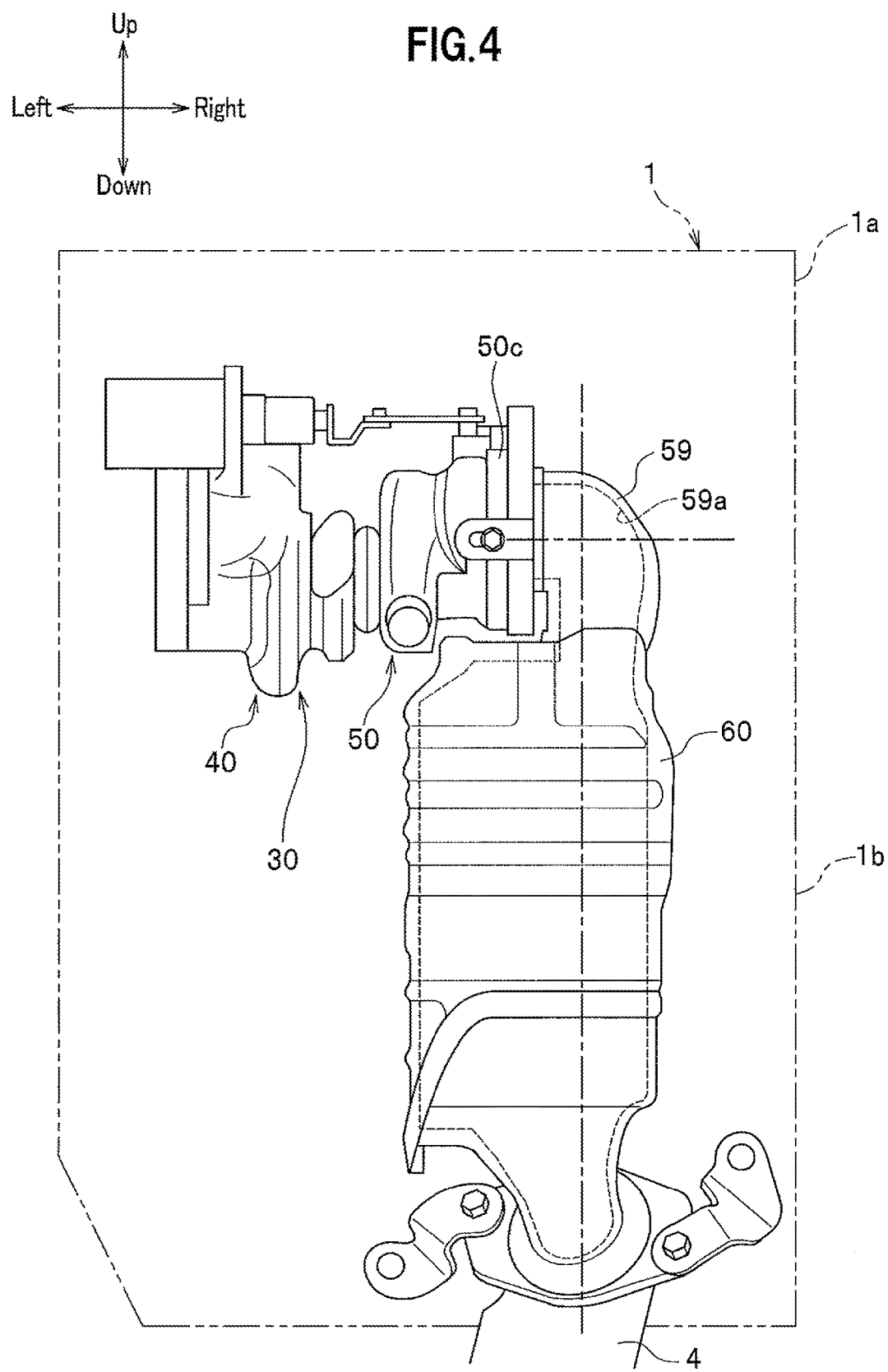
FIG. 4 is a drawing of the exhaust structure according to the embodiment of the present invention, viewed from a front direction.

As shown in FIG. 4, provided in front of a cylinder block 1b is the exhaust emission control device 60. The exhaust emission control device 60 is a catalytic converter provided between the turbine housing 50 and an exhaust pipe 4.

Provided between the turbine housing 50 and the exhaust emission control device 60 is a connecting member 59. Formed in the connecting member 59 is a connecting passage 59a.

The connecting passage 59a is, as shown in FIG. 2, a flow passage connecting the outflow port 50b of the turbine housing 50 and the inflow port of the exhaust emission control device 60. The connecting passage 59a curves, as shown in FIG. 4, at a substantially right angle as going in the left-right direction (in an aligning direction AD of the cylinders 2) and turns downward (in an axial direction of the cylinders 2).

A lower end of a part of the connecting passage 59a extended in the vertical direction is connected to the exhaust emission control device 60 which extends in the vertical direction (the axial direction of the cylinders 2).

The exhaust structure 3 according to the embodiment is, as shown in FIG. 5, provided with a thermal insulation cover 70 covering a front portion of the turbine housing 50. The thermal insulation cover 70 prevents heat generated in the turbine housing 50 from transmitting to various components arranged around the turbine housing 50.

A front face of the thermal insulation cover 70 has a plurality of ventilation air-guide-ports 71 open. The ventilation air-guide-port 71 includes a cover portion 71a partially covering the opening of ventilation air-guide-port 71, but opens at the lower side of the cover portion 71a. In other words, the ventilation air-guide-port 71 opens downwardly.

An upper surface of the thermal insulation cover 70 has a through hole 72 opening to allow the sensor 58 to be inserted therethrough. Further, in the sensor 58, a sensor cover 58b having a hollow cylindrical shape is installed to cover a part of the sensor 58 protruding from the turbine housing 50.

Formed between an outer surface of the sensor cover 58b and an inner circumferential surface of the through hole 72 of the thermal insulation cover 70 is a gap 73. The ambient air flowing into the thermal insulation cover 70 through the ventilation air-guide-ports 71 is discharged to the external through the gap 73 between the sensor cover 58b and the through hole 72 and a gap between the turbine housing 50 formed in a direction vertical to the paper face of FIG. 5 (not shown).

The exhaust structure 3 as described above can increase a flow velocity of the exhaust gas by allowing the exhaust gas discharged from the cylinder 2 to flow into the tapered portion 53c as shown in FIG. 1. This accelerates exchanging of the exhaust gas around detection range of the sensor 58, so that the state of the exhaust gas for each of the cylinders 2 can be rapidly detected.

In addition, the exhaust gas discharged from the cylinders is funneled by the tapered portion 53c, which prevents the exhaust gas from spreading.

Further, when the waste gate valve 56 is opened, the exhaust gas flows into the waste gate passage 55 (see FIG. 2) on a downstream side of the sensor 58, which prevents the sensor 58 from influencing on the detection accuracy of the exhaust gas.

Accordingly, in the exhaust structure 3 according to the embodiment, the state of the exhaust gas of each of the cylinders 2 can be accurately detected with the sensor 58, which results in increase in the detection accuracy of the burning state of each of the cylinders 2.

In the exhaust structure 3 according to the embodiment, the sensor mounting part 53b is offset on the left side of the center in the left-right direction of the inflow port 50a by a predetermined distance D1 to secure a space on a right side of the inflow member 53.

Further, at a space secured on a right side of the inflow member 53, the waste gate valve 56 is provided, so that an installation space for the supercharger 30 becomes narrower.

Further, as shown in FIG. 4, this configuration allows the connecting member 59 connected to the right side part of the turbine housing 50 to be offset to the left side. This allows the connecting passage 59a between the turbine housing 50 and the exhaust emission control device 60 to be curved at a substantially right angle downwardly from the left-right direction, so that the exhaust emission control device 60 extends vertically. Accordingly, a pressure loss in the exhaust gas in the connecting passage 59a can be made small, so that an exhaust efficiency can be increased, while the exhaust emission control device 60 is housed within a width in the left-right direction of the internal combustion engine 1.

Further, as shown in FIG. 3, the connecting flange 50c can be disposed on the left side of the fixing hole 57a at a right lower corner of the fixing flange 57, so that a space can be provided in front of the fixing hole 57a. When a bolt inserted into the fixing hole 57a is fixed to the cylinder head 1a (see FIG. 1), this allows the bolt to be fastened after inserting a tool in front of the cylinder head 1a from a side of the internal combustion engine 1. As described above, because the tool can be arranged from a side of the internal combustion engine 1 in line, so that the fixing flange 57 can be installed in the cylinder head 1a and an operation efficiency can be enhanced.

Further, the exhaust emission control device 60 is disposed near the cylinder block 1b and the exhaust gas at a high temperature discharged by the supercharger 30 directly flows into the exhaust emission control device 60. Accordingly, a temperature of the catalyst in the exhaust emission control device 60 can be increased.

As shown FIG. 5, the exhaust structure 3 according to the embodiment, the thermal insulation cover 70 covering the turbine housing 50 has the ventilation air-guide-ports 71 open, which prevents a temperature increase in the sensor 58 by introducing the ambient air into the thermal insulation cover 70. Further the ventilation air-guide-port 71 in the thermal insulation cover 70 opens in a downward direction of the vehicle, which prevents a temperature increase in the sensor 58 in the thermal insulation cover 70 without losing the heat insulating effect toward the front thereof with the thermal insulation cover 70.

As the embodiment of the present invention has been described, the present invention is not limited to the above-described embodiment, but may be appropriately modified without departure of the spirit of the subject matter of the present invention.

The tapered portion 53c according to the embodiment, as shown in FIG. 1, the right side part 53d of the inflow member 53 is successively offset to the left as going to the sensor mounting part 53b from the inflow port 50a.

However, it is possible to form the tapered portion by successively offset the left side part 53e of the inflow member 53 to the right side as going from the inflow port 50a to the sensor mounting part 53b.

Further, it is allowed to form the tapered portion by successively offsetting both the right side part 53d and the left side part 53e of the inflow member 53 to the inner side as going from the inflow port 50a to the sensor mounting part 53b.

In the embodiment, the exhaust manifold 20 is provided inside of the cylinder head 1a, but may be provided outside the cylinder head 1a.

The inflow member 53 of the turbine housing 50 is formed, as shown in FIG. 5, having a downward spiral, but may have an upward spiral, or horizontally.

The sensor 58 according to the embodiment detects, as shown in FIG. 1, the air-fuel ratio of the exhausted gas in the inflow passage 53a, but other various types of sensors can be used to detect the state of the temperature or a quantity of oxygen of the exhaust gas.

In the embodiment, though the axial direction of the cylinders 2 is arranged in the vertical direction, but the direction is not limited.

DESCRIPTION OF REFERENCE SYMBOLS

1 Internal Combustion Engine
1a Cylinder Head
1b Cylinder Block
2 Cylinder
3 Exhaust Structure
10 Intake Air Passage
11 Intercooler
20 Exhaust Manifold
21 Collector
30 Supercharger
31 Connecting Shaft
40 Compressor Housing
41 Compressor Blades
42a Housing Space
50 Turbine Housing
50a Inflow Port
50b Outflow Port 50c Connecting Flange
51 Turbine Blades
52 Housing Member
52a Housing Space
53 Inflow Member
53a Inflow Passage
53b Sensor Mounting Part
3c Tapered portion
53f Connecting Member
54 Outflow Member
54a Outflow Passage
55 Waste gate Passage
56 Waste gate Valve
57 Fixing Flange
58 Sensor
59 Connecting Member
59a Connecting Passage
60 Exhaust Emission Control Device
70 Thermal Insulation Cover
71 Ventilation air-guide-port

The invention claimed is:

1. An exhausting structure for an internal combustion engine including a plurality of cylinders aligned in an aligning direction, comprising:
   an exhaust manifold including a collector to collect exhaust gases exhausted from the cylinders; and
   a supercharger including a turbine housing connected to the exhaust manifold, the turbine housing comprising:
   an inflow port communicating with the collector;
   a blade housing including a blade space to house a turbine having turbine blades; and
   an inflow member, which is a conduit, including an inflow passage formed to communicate from the inflow port to the blade space,
      wherein the inflow member comprises a sensor mount part to mount a sensor to detect a state of the exhaust gas in the inflow passage, and a tapered portion of the conduit having a width in the aligning direction of the cylinders decreasing as going from the inflow port to the blade space sensor mount part, are formed,
   wherein a center of the sensor mount part is offset in the aligning direction by a predetermined distance relative to a center of a width of the inflow port and disposed on one side the center of the width of the inflow port in the aligning direction of the cylinders, and
   wherein the tapered portion has a first wall on the one side of the center of the width of the inflow port and a second wall on an another side of the center of the inflow port, wherein the first wall is flat and a width from the second wall to an axis through the center of the sensor mount part perpendicular to the aligning direction decreases from the inflow port to the sensor mounting part, the exhausting structure further comprising an outflow port, and a first connecting member,
   wherein the turbine housing further comprises:
      an outflow passage communicating from the blade space to the outflow port and a waste gate passage communicating from the inflow passage to the outflow passage; and
      a waste gate valve, installed at the first connecting member, to adjust a flow rate of the exhaust gas in the waste gate passage; and
   wherein the first connecting member connects the inflow passage to the waste gate passage on a downstream side in a flowing direction of the exhaust gas from the sensor mount part; and
   wherein the waste gate valve is disposed on the another side of the center of the width of the inflow port in the aligning direction.

2. The exhausting structure as claimed in claim 1, further comprising a thermal insulation cover covering at least a part of the turbine housing, wherein the thermal insulation cover includes a ventilation air-guide-port which opens in the thermal insulation cover.

3. The exhausting structure as claimed in claim 2, wherein the internal combustion engine is mounted on a vehicle, and wherein the ventilation air-guide-port opens in a downward direction of the vehicle.

4. The exhausting structure as claimed in claim 1, wherein the exhaust manifold is installed in a cylinder head of the internal combustion engine,
   wherein an exhaust emission control device is installed on the another side of the center of the inflow port in the aligning direction of the turbine housing,
   wherein a second connecting passage provided between the blade housing and the exhaust emission control device curves from the aligning direction to an axial direction of the cylinders, and
   wherein the exhaust emission control device extends along the axial direction.

5. The exhausting structure as claimed in claim 1, wherein the supercharger comprises the turbine housing and a compressor housing connected to an intake air passage, wherein the turbine housing and the compressor housing are arranged side by side in the aligning direction; and
   the compressor housing disposed on the another side of the center of the inflow port in the aligning direction.

* * * * *